United States Patent
Huang

(10) Patent No.: US 11,330,085 B2
(45) Date of Patent: May 10, 2022

(54) DATA TRANSMISSION PROTECTION METHOD, DEVICE, SYSTEM, AND COMPUTER READABLE STORAGE MEDIUM

(71) Applicant: ZTE CORPORATION, Guangdong (CN)

(72) Inventor: Guangping Huang, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/043,060

(22) PCT Filed: Jan. 22, 2019

(86) PCT No.: PCT/CN2019/072731
§ 371 (c)(1),
(2) Date: Sep. 29, 2020

(87) PCT Pub. No.: WO2019/205756
PCT Pub. Date: Oct. 31, 2019

(65) Prior Publication Data
US 2021/0037121 A1 Feb. 4, 2021

(30) Foreign Application Priority Data

Apr. 27, 2018 (CN) .......................... 201810390063.0

(51) Int. Cl.
*H04L 12/28* (2006.01)
*H04L 69/22* (2022.01)
(Continued)

(52) U.S. Cl.
CPC ............ *H04L 69/22* (2013.01); *H04L 1/0007* (2013.01); *H04L 47/32* (2013.01); *H04L 69/04* (2013.01)

(58) Field of Classification Search
None
See application file for complete search history.

(56) References Cited

U.S. PATENT DOCUMENTS 6,483,804 B1 * 11/2002 Muller ................. H04L 49/602
370/230
8,060,804 B2 11/2011 Li et al.
(Continued)

FOREIGN PATENT DOCUMENTS

| CN | 1909436 A | 2/2007 |
|---|---|---|
| CN | 102325009 A | 1/2012 |
| JP | 2007060345 A | 3/2007 |

OTHER PUBLICATIONS

WIPO, International Search Report dated Mar. 29, 2019.
European Patent Office, The extended European search report dated Dec. 7, 2021 for application No. EP19792151.3.

*Primary Examiner* — Gerald A Smarth
(74) *Attorney, Agent, or Firm* — Li & Cai Intellectual Property (USA) Office

(57) ABSTRACT

The present disclosure discloses a data transmission protection method, a data transmission protection device, a data transmission protection system and a computer readable storage medium, the method includes: encapsulating a packet header for a data flow to be transmitted at an ingress node to form an encapsulated data flow, where the packet header includes a control word and a flow identification; copying the encapsulated data flow to obtain a copied data flow, and transmitting the encapsulated data flow and the copied data flow together; and recovering the data flow at a terminating node according to the control word and the flow identification.

5 Claims, 4 Drawing Sheets

(51) Int. Cl.
*H04L 1/00* (2006.01)
*H04L 47/32* (2022.01)
*H04L 69/04* (2022.01)

(56) References Cited

U.S. PATENT DOCUMENTS

| | | | |
|---|---|---|---|
| 8,472,438 B2* | 6/2013 | Kini | H04L 45/68 |
| | | | 370/389 |
| 9,686,381 B1* | 6/2017 | Singh | H04L 67/2814 |
| 2006/0143300 A1* | 6/2006 | See | H04L 43/026 |
| | | | 709/227 |
| 2007/0280217 A1 | 12/2007 | Flanagan et al. | |
| 2009/0168773 A1* | 7/2009 | Crookes | H04N 21/23608 |
| | | | 370/389 |
| 2009/0178096 A1 | 7/2009 | Menn et al. | |
| 2012/0158990 A1* | 6/2012 | Losio | H04N 21/4381 |
| | | | 709/236 |
| 2013/0132789 A1 | 5/2013 | Watford et al. | |

* cited by examiner

MPLS pseudowire (PW) structure of packet header

IPv6 structure of packet header

US 11,330,085 B2

DATA TRANSMISSION PROTECTION METHOD, DEVICE, SYSTEM, AND COMPUTER READABLE STORAGE MEDIUM

TECHNICAL FIELD

The present disclosure relates to the field of communication technology, and in particular, to a data transmission protection method, a data transmission protection device, a data transmission protection system, and a computer readable storage medium.

BACKGROUND

In the communication field, for some communication services, such as industrial control, sensitive to time delay or packet loss, the time delay and a packet loss rate of the services are conventionally guaranteed through a proprietary device/proprietary protocol (such as field bus)/proprietary line, and along with gradual fusion of IT and OT, an IT network must provide deterministic network services similar to OT to support seamless docking and migration of the services; some new services, such as a block chain, are more and more sensitive to the time delay due to applications supported by the new services, best effort services of current network cannot meet requirements, and the network is urgently required to provide services such as deterministic time delay/packet loss/jitter and the like.

SUMMARY

In view of above, an object of the present disclosure is to provide a method, a device and a system for protecting data transmission and a computer-readable storage medium, which reduce or even eliminate an influence of a packet loss event and reduce a time delay of service by performing a same-path redundant copying on a data flow of a low-speed deterministic network service.

Technical solutions adopted by the present disclosure for solving at least one technical problem described above are as follows.

According to an aspect of the present disclosure, there is provided a data transmission protection method, including: encapsulating a packet header for a data flow to be transmitted at an ingress node to form an encapsulated data flow, where the packet header comprises a control word and a flow identification; copying the encapsulated data flow to obtain a copied data flow, and transmitting the encapsulated data flow and the copied data flow together; and recovering the data flow at a terminating node according to the control word and the flow identification.

In some implementations, before encapsulating the packet header for the data flow to be transmitted at the ingress node, the method further includes: determining whether the data flow is a low-speed data flow sensitive to time delay and packet loss, in response to that the data flow is the low-speed data flow sensitive to time delay and packet loss, assigning a unique flow identification to the data flow, and encapsulating the packet header for the data flow to be transmitted at the ingress node; and in response to that the data flow is not the low-speed data flow sensitive to time delay and packet loss, directly transmitting the data flow.

In some implementations, the step of copying the encapsulated data flow to obtain the copied data flow, and transmitting the encapsulated data flow and the copied data flow together includes: copying the encapsulated data flow to obtain (1+n) encapsulated data flows, where flow identifications and control words of the (1+n) encapsulated data flows are completely the same, and n is an integer greater than or equal to 1; and transmitting the (1+n) encapsulated data flows to a receiving terminal together.

In some implementations, the step of recovering the data flow at the terminating node according to the control word and the flow identification includes: receiving the data flow, determining whether the data flow reaches the terminating node for a first time according to the control word of the data flow, in response to that the data flow reaches the terminating node for the first time, recovering the data flow, and removing the packet header encapsulated for the data flow; and in response to that the control word of the data flow currently received is the same as the control word of the data flow previously received, discarding the data flow currently received.

According to another aspect of the present disclosure, there is provided a data transmission protection device, including: an encapsulation module configured to encapsulate a packet header for a data flow to be transmitted at an ingress node to form an encapsulated data flow, where the packet header includes a control word and a flow identification; a copying and transmitting module configured to copy the encapsulated data flow to obtain a copied data flow and transmit the encapsulated data flow and the copied data flow together; and a recovery module configured to recover the data flow at a terminating node according to the control word and the flow identification.

In some implementations, the data transmission protection device further includes: a determining module configured to determine whether the data flow is a low-speed data flow sensitive to time delay and packet loss, in response to that the data flow is the low-speed data flow sensitive to time delay and packet loss, assign a unique flow identification to the data flow, and encapsulate the packet header for the data flow to be transmitted at the ingress node; and in response to that the data flow is not the low-speed data flow sensitive to time delay and packet loss, directly transmit the data flow.

In some implementations, the copying and transmitting module is configured to: copy the encapsulated data flow to obtain (1+n) encapsulated data flows, where flow identifications and control words of the (1+n) encapsulated data flows are completely the same, and n is an integer greater than or equal to 1; and transmit the (1+n) encapsulated data flows to a receiving terminal together.

In some implementations, the recovery module includes: a receiving element configured to receive the data flow; a recovery element configured to determine whether the data flow reaches the terminating node for a first time according to the control word of the data flow, and in response to that the data flow reaches the terminating node for the first time, recover the data flow and remove the packet header encapsulated for the data flow; and a discarding element configured to discard the data flow currently received in response to that the control word of the data flow currently received is the same as the control word of the data flow previously received.

According to yet another aspect of the present disclosure, there is provided a data transmission protection system including a memory, a processor, and at least one application program stored in the memory and configured to perform the data transmission protection method described above when executed by the processor.

According to still another aspect of the present disclosure, there is provided a computer-readable storage medium on which a computer program is stored, the program implementing the data transmission protection method described above when executed by a processor.

Embodiments of the present disclosure provide the data transmission protection method, the data transmission protection device, the data transmission protection system and the computer readable storage medium, the method includes: encapsulating a packet header for a data flow to be transmitted at an ingress node to form an encapsulated data flow, where the packet header includes a control word and a flow identification; copying the encapsulated data flow to obtain a copied data flow, and transmitting the encapsulated data flow and the copied data flow together; and recovering the data flow at a terminating node according to the control word and the flow identification, and thus reducing or even eliminating an influence of a packet loss event and reducing a time delay of service by performing same-path redundant copying on the data flow of the low-speed deterministic network service.

Objects, features, and advantages of the present disclosure will be further explained with reference to the accompanying drawings.

DESCRIPTION OF EMBODIMENTS

In order to make technical problems to be solved by the present disclosure, technical solutions and beneficial effects of the present disclosure clearer and more obvious, the present disclosure is further described in detail below with reference to the accompanying drawings and embodiments. It should be understood that the specific embodiments described herein are merely illustrative of the present disclosure and do not limit the present disclosure.

Figure 1:
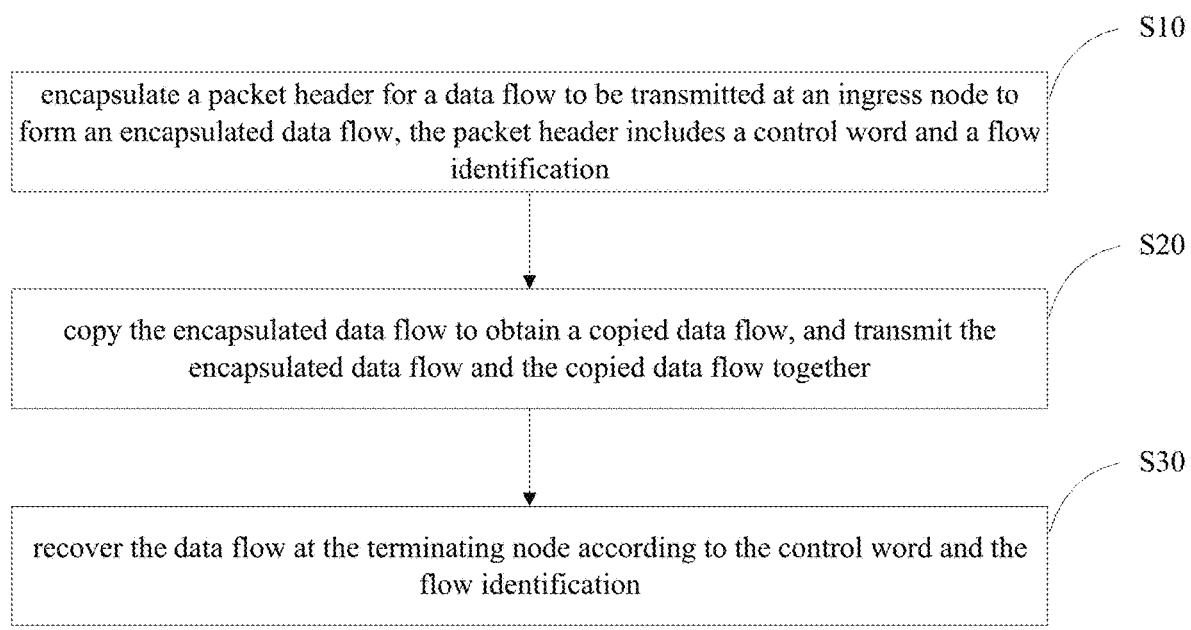
FIG. 1 is a flowchart of a data transmission protection method according to an embodiment of the present disclosure.

As shown in FIG. 1, an embodiment of the present disclosure provides a data transmission protection method, including steps S10 to S30.

At step S10, a packet header is encapsulated for a data flow to be transmitted at an ingress node to form an encapsulated data flow, where the packet header includes a control word and a flow identification.

At step S20, the encapsulated data flow is copied to obtain a copied data flow, and the encapsulated data flow and the copied data flow are transmitted together.

At step S30, the data flow is recovered at a terminating node according to the control word and the flow identification.

In the embodiment, a same-path redundant copying is performed on the data flow of a low-speed deterministic network service, so that an influence of a packet loss event is reduced or even eliminated, and the time delay of the service is reduced.

In the embodiment, each of copy and recovery processes of the data flow (also referred to as a service flow) is finished at an edge node of a network, where the ingress node is an edge node of the network at a transmitting terminal, and the data flow is encapsulated and copied at the ingress node, and the terminating node is an edge node of the network at a receiving terminal, and the data flow is recovered at the terminating node.

Figure 2:
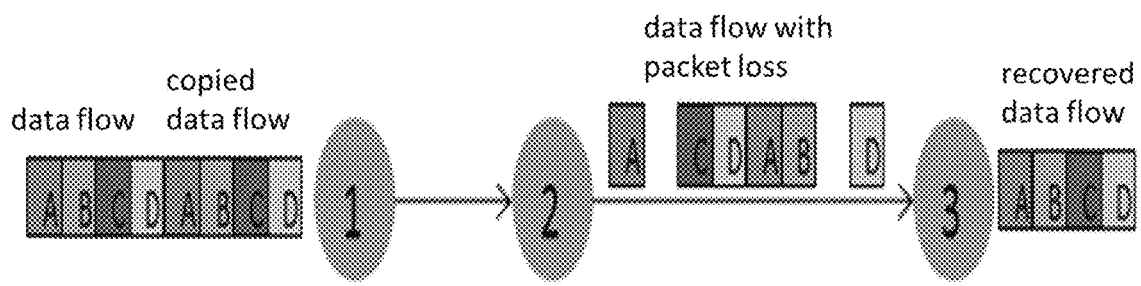
FIG. 2 is a schematic diagram of a data flow transmission according to an embodiment of the present disclosure.

As shown in FIG. 2, in the embodiment, at least one copied data flow (including four data packets ABCD shown in FIG. 2) is obtained by copying the data flow to be transmitted (including the four packets ABCD), and is transmitted together with an original data flow, even if there is a packet loss event in a transmission process, as shown in FIG. 2, a packet B in the original data flow is lost, and a packet C in the copied data flow is lost, since there is the copied data flow, when finally recovering, the four packets ABCD may still be obtained, and the complete data flow is received.

Figure 3:
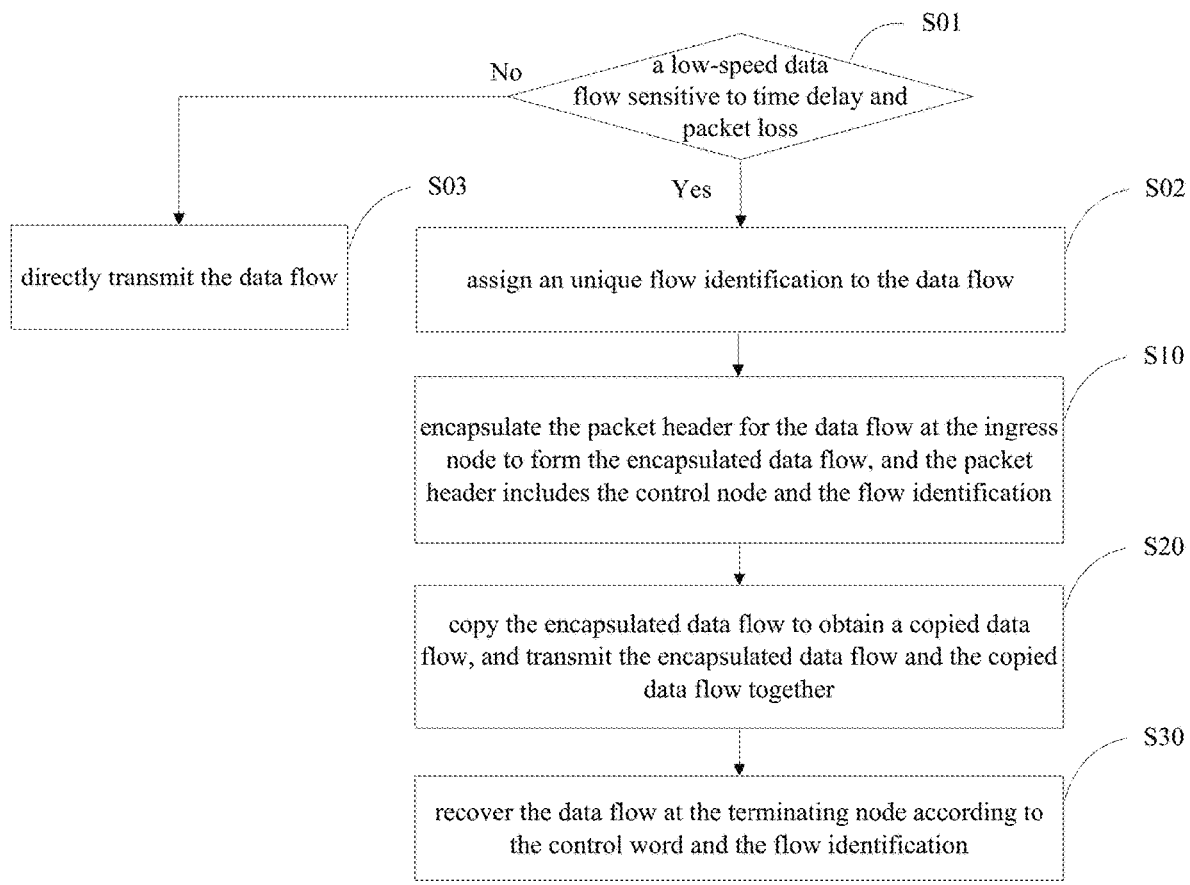
FIG. 3 is another flowchart of a data transmission protection method according to an embodiment of the present disclosure.

As shown in FIG. 3, in the embodiment, before the step S10, the method further includes steps S01 to S03.

At step S01, it is determined whether the data flow is a low-speed data steam sensitive to time delay and packet loss.

At step S02, in response to that the data flow is the low-speed data steam sensitive to time delay and packet loss, a unique flow identification is assigned to the data flow, and enter the step S10 to encapsulate the packet header for the data flow to be transmitted at the ingress node.

At step S03, in response to that the data flow is not the low-speed data steam sensitive to time delay and packet loss, directly transmit the data flow.

In the embodiment, a rate threshold for determining whether the data flow is the low-speed data flow sensitive to time delay and packet loss is recommended to be 100 kbps, and when a transmission rate of the data flow is less than the rate threshold, the data flow is the low-speed data flow. The rate threshold may be flexibly configured by an upper layer application according to a capacity of the network.

Figure 4:
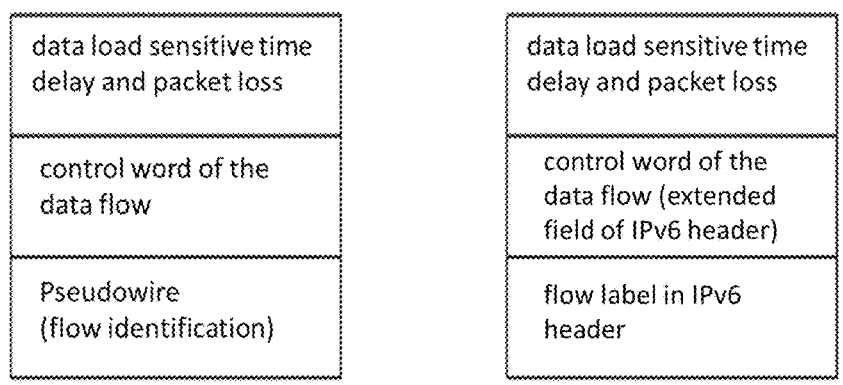
FIG. 4 is a schematic diagram of structure of a packet header according to an embodiment of the present disclosure.

In the embodiment, when the packet header is encapsulated for the data flow, the packet header includes a data payload, a control word, and a flow identification. FIG. 4 shows a schematic diagram of structure of the packet header, which includes two modes, one is an MPLS PW mode, and the other is an IPv6 mode, and with such structural design, it is easy to keep compatibility with a data plane design of a DetNet (deterministic network).

In the embodiment, the flow identification is used to uniquely identify a specific data flow, in a network domain where the data flow is transmitted, for nodes of the network. For a same data flow or a same packet, the flow identification and the control word corresponding thereto are constant, and are irrelevant to whether the redundant copying is performed. Specifically, a PW (Pseudowire) label identification, and an identification combining a flow label and a source address in an IPv6 header structure may be used to identify the data flow.

Figure 5:
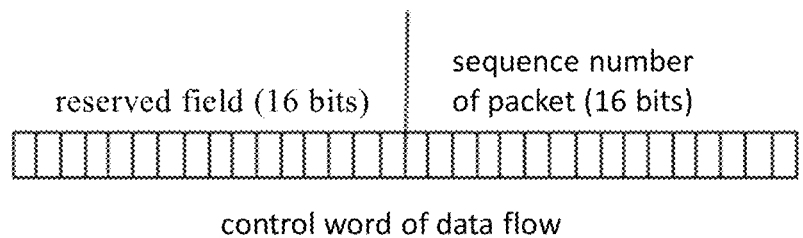
FIG. 5 is a schematic diagram of structure of a control word according to an embodiment of the present disclosure.

As shown in FIG. 5, in the embodiment, the control word mainly includes a packet sequence number. The control word may have a total of four bytes, two bytes for the packet sequence number, and two bytes for a reserved field, and such structural design is adopted to maintain compatibility with technical mechanisms related to multi-path service protection in TSN (time sensitive network) and DetNet (deterministic network). Control words corresponding to the same service flow data packets are the same, and no matter how many copies of an original data packet are, the control words are the same as that of the original data packet, so that the data flow may be identified and recovered at the edge node.

In the embodiment, the step S20 specifically includes: copying the encapsulated data flow to obtain (1+n) encapsulated data flows, flow identifications and control words of the (1+n) encapsulated data flows are completely the same, and n is an integer greater than or equal to 1; and transmitting the (1+n) encapsulated data flows to a receiving terminal together.

In the embodiment, a value of n may be statically configured, or may be dynamically adjusted by a control plane according to network packet loss statistical data, where the value of n is configured to be relative large in response to that a current packet loss rate is relative high, and the value of n is configured to be relative small in response to that the current packet loss rate is relative low.

In the embodiment, a method for copying the encapsulated data flow includes: copying the encapsulated data flow according to a time slice and copying the encapsulated data flow according to a number of specific consecutive packets, specifically, in response to that the service is a time continuous service, data is extracted and copied according to the time slice, such as 1 millisecond; and in response to that the service is an intermittent burst short-time service, data is extracted and copied according to the number of packets, such as copying is performed every 1000 packets.

In the embodiment, if a relay node participates in the transmission of the data flow, the relay node performs indifferent forwarding on the data flow without identifying the copied redundant data or participating in a copying operation.

In the embodiment, the step S30 includes: receiving the data flow, determining whether the data flow reaches the terminating node for a first time according to the control word of the data flow, in response to that the data flow reaches the terminating node for the first time, recovering the data flow, and removing the packet header encapsulated for the data flow; and in response to that the control word of the data flow currently received is the same as the control word of the data flow previously received, discarding the data flow currently received.

Taking FIG. 2 as an example, when the terminating node (node 3 shown in the figure) receives the data flow ACD-ABD subjected to the packet loss, in response to that the data packet A is received for a first time, the data packet A is recovered, and the packet header previously encapsulated for the data packet A is removed, and in response to that the data packet A is received for a second time, since the data packet A is a copied data packet A, the control word of the copied data packet A is the same as the control word of the data packet A received for the first time, the copied data packet A is discarded.

In an application scenario of low-speed data flow, under a current or future IT network environment of services sensitive to time delay and packet loss, multiplication of the data flow caused by a redundant copying mechanism may be ignored to a certain extent for a capacity of the current IT network, but the packet loss and the time delay can be greatly reduced.

Figure 6:
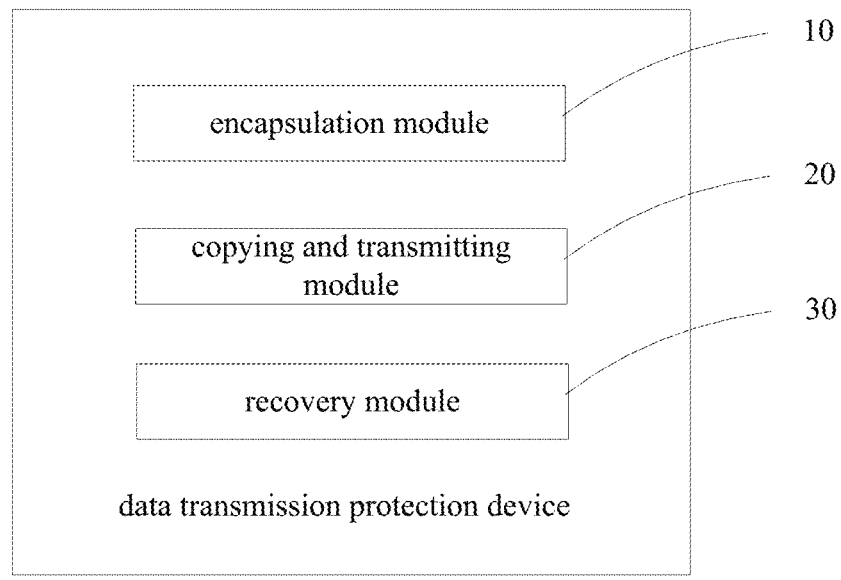
FIG. 6 is a block diagram of an exemplary structure of a data transmission protection device according to an embodiment of the present disclosure.

As shown in FIG. 6, an embodiment of the present disclosure provides a data transmission protection device, including: an encapsulation module 10, configured to encapsulate a packet header for a data flow to be transmitted at an ingress node to form an encapsulated data flow, where the packet header includes a control word and a flow identification; a copying and transmitting module 20, configured to copy the encapsulated data flow to obtain a copied data flow and transmit the encapsulated data flow and the copied data flow together; and a recovery module 30, configured to recover the data flow at a terminating node according to the control word and the flow identification.

In the embodiment, a same-path redundant copying is performed on the data flow of a low-speed deterministic network service, so that an influence of a packet loss event is reduced or even eliminated, and the time delay of the service is reduced.

In the embodiment, each of copy and recovery processes of the data flow (also referred to as a service flow) is finished at an edge node of a network, where the ingress node is an edge node of the network at a transmitting terminal, and the data flow is encapsulated and copied at the ingress node, and the terminating node is an edge node of the network at a receiving terminal, and the data flow is recovered at the terminating node.

As shown in FIG. 2, in the embodiment, at least one copied data flow (including four data packets ABCD shown in FIG. 2) is obtained by copying the data flow to be transmitted (including the four packets ABCD), and is transmitted together with an original data flow, even if there is a packet loss event in a transmission process, as shown in FIG. 2, a packet B in the original data flow is lost, and a packet C in the copied data flow is lost, since there is the copied data flow, when finally recovering, the four packets ABCD may still be obtained, and the complete data flow is received.

Figure 7:
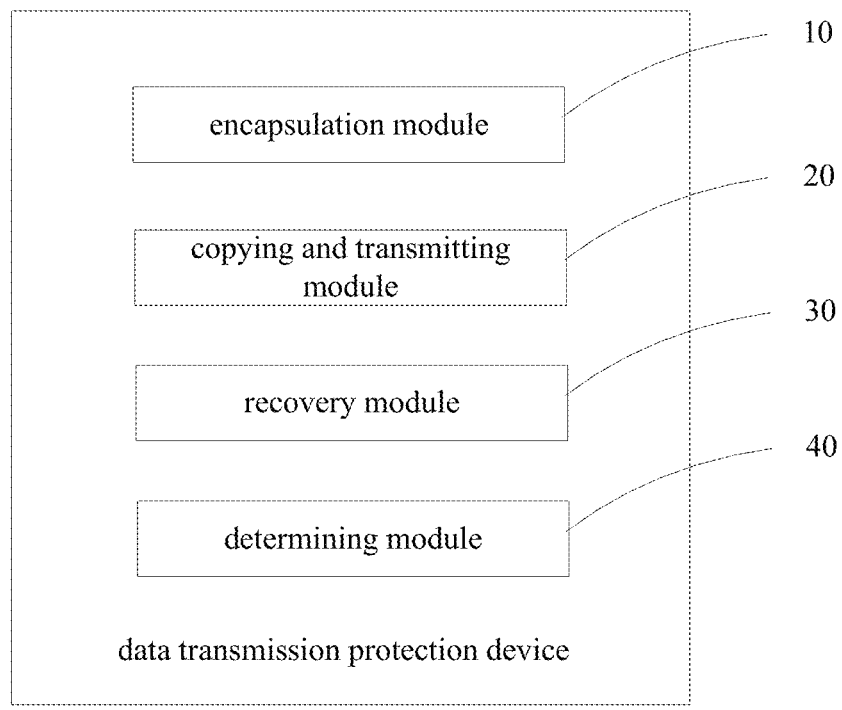
FIG. 7 is a block diagram of another exemplary structure of a data transmission protection device according to an embodiment of the present disclosure.

As shown in FIG. 7, in the embodiment, the data transmission protection device further includes: a determining module 40 configured to determine whether the data flow is a low-speed data flow sensitive to time delay and packet loss, in response to that the data flow is the low-speed data flow sensitive to time delay and packet loss, assign a unique flow identification to the data flow, and encapsulate the packet header for the data flow to be transmitted at the ingress node; and in response to that the data flow is not the low-speed data flow sensitive to time delay and packet loss, directly transmit the data flow.

In the embodiment, a rate threshold for determining whether the data flow is the low-speed data flow sensitive to time delay and packet loss is recommended to be 100 kbps, and when a transmission rate of the data flow is less than the rate threshold, the data flow is the low-speed data flow. The rate threshold may be flexibly configured by an upper layer application according to a capacity of the network.

In the embodiment, when the packet header is encapsulated for the data flow, the packet header includes a data payload, a control word, and a flow identification. FIG. 4 shows a schematic diagram of structure of the packet header, which includes two modes, one is an MPLS PW mode, and the other is an IPv6 mode, and with such structural design, it is easy to keep compatibility with a data plane design of a DetNet (deterministic network).

In the embodiment, the flow identification is used to uniquely identify a specific data flow, in a network domain where the data flow is transmitted, for nodes of the network. For a same data flow or a same packet, the flow identification and the control word corresponding thereto are constant, and are irrelevant to whether the redundant copying is performed. Specifically, a PW (Pseudowire) label identification, and an identification combining a flow label and a source address in an IPv6 header structure may be used to identify the data flow.

As shown in FIG. 5, in the embodiment, the control word mainly includes a packet sequence number. The control word may have a total of four bytes, two bytes for the packet sequence number, and two bytes for a reserved field, and such structural design is adopted to maintain compatibility with technical mechanisms related to multi-path service protection in TSN (time sensitive network) and DetNet (deterministic network). Control words corresponding to the same service flow data packets are the same, and no matter how many copies of an original data packet are, the control words are the same as that of the original data packet, so that the data flow may be identified and recovered at the edge node.

In the embodiment, the copying and transmitting module specifically is configured to: copy the encapsulated data flow to obtain (1+n) encapsulated data flows, where flow identifications and control words of the (1+n) encapsulated data flows are completely the same, and n is an integer greater than or equal to 1; and transmit the (1+n) encapsulated data flows to a receiving terminal together.

In the embodiment, a value of n may be statically configured, or may be dynamically adjusted by a control plane according to network packet loss statistical data, where the value of n is configured to be relative large in response to that a current packet loss rate is relative high, and the value of n is configured to be relative small in response to that the current packet loss rate is relative low.

In the embodiment, a method for copying the encapsulated data flow includes: copying the encapsulated data flow according to a time slice and copying the encapsulated data flow according to a number of specific consecutive packets, specifically, in response to that the service is a time continuous service, data is extracted and copied according to the time slice, such as 1 millisecond; and in response to that the service is an intermittent burst short-time service, data is extracted and copied according to the number of packets, such as copying is performed every 1000 packets.

In the embodiment, if a relay node participates in the transmission of the data flow, the relay node performs indifferent forwarding on the data flow without identifying the copied redundant data or participating in a copying operation.

Figure 8:
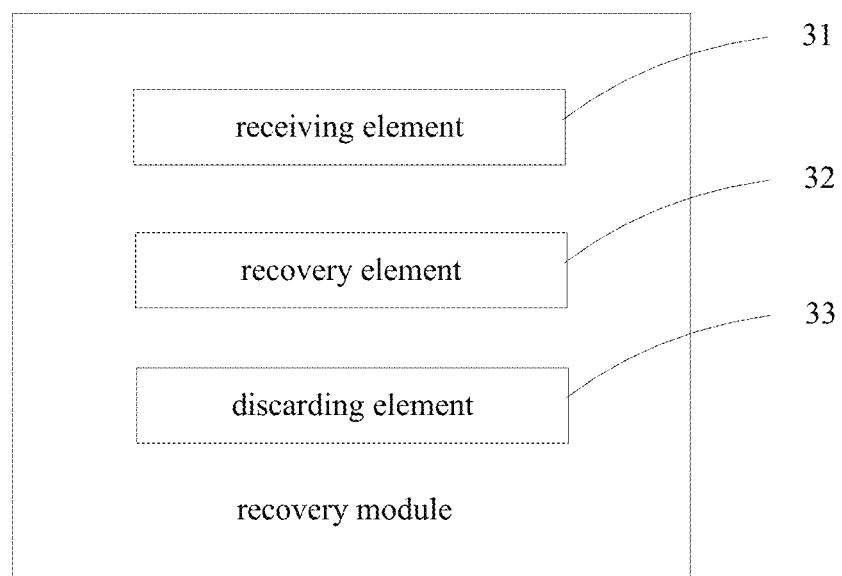
FIG. 8 is a block diagram of an exemplary structure of a recovery module shown in FIG. 6.

As shown in FIG. 8, in the embodiment, the recovery module includes:

a receiving element 31 configured to receive the data flow;

a recovery element 32 configured to determine whether the data flow reaches the terminating node for a first time according to the control word of the data flow, and in response to that the data flow reaches the terminating node for the first time, recover the data flow and remove the packet header encapsulated for the data flow; and a discarding element 33 configured to discard the data flow currently received in response to that the control word of the data flow currently received is the same as the control word of the data flow previously received.

Taking FIG. 2 as an example, when the terminating node (node 3 shown in the figure) receives the data flow ACD-ABD subjected to the packet loss, in response to that the data packet A is received for a first time, the data packet A is recovered, and the packet header previously encapsulated for the data packet A is removed, and in response to that the data packet A is received for a second time, since the data packet A is a copied data packet A, the control word of the copied data packet A is the same as the control word of the data packet A received for the first time, the copied data packet A is discarded.

In an application scenario of low-speed data flow, under a current or future IT network environment of services sensitive to time delay and packet loss, multiplication of the data flow caused by a redundant copying mechanism may be ignored to a certain extent for a capacity of the current IT network, but the packet loss and the time delay can be greatly reduced.

An embodiment of the present disclosure provides a data transmission protection system, including a memory, a processor, and at least one application program stored in the memory and configured to be executed by the processor, the application program being configured to perform the data transmission protection method of the embodiment described above.

An embodiment of the present disclosure provides a computer-readable storage medium, on which a computer program is stored, and the program, when executed by a processor, implements the data transmission protection method of the embodiment described above.

It should be noted that embodiments of the device, the system, and the computer-readable storage medium belong to the same concept as the embodiment of the method, and specific implementation processes thereof are described in detail in the embodiment of the method, and technical features in the embodiment of the method are all correspondingly applicable in the embodiments of the device, the system and the computer-readable storage medium, and are not described herein again.

Embodiments of the present disclosure provide the data transmission protection method, the data transmission protection device, the data transmission protection system and the computer readable storage medium, the method includes: encapsulating a packet header for a data flow to be transmitted at an ingress node to form an encapsulated data flow, where the packet header includes a control word and a flow identification; copying the encapsulated data flow to obtain a copied data flow, and transmitting the encapsulated data flow and the copied data flow together; and recovering the data flow at a terminating node according to the control word and the flow identification, and thus reducing or even eliminating an influence of a packet loss event and reducing a time delay of service by performing same-path redundant copying on the data flow of the low-speed deterministic network service.

Through the description of the foregoing embodiments, it is clear to those skilled in the art that the method of the foregoing embodiment may be implemented by software plus a necessary general hardware platform, and certainly may also be implemented by hardware, but in many cases, the former is a better embodiment. Based on such understanding, the technical solutions of the present disclosure may be embodied in the form of a software product, which is stored in a storage medium (such as a ROM/RAM, a magnetic disk, and an optical disk), and includes several instructions for enabling a terminal device (which may be a mobile phone, a computer, a server, an air conditioner, or a network device) to perform the method according to the embodiment of the present disclosure.

The embodiments of the present disclosure have been described above with reference to the accompanying drawings, but the scope of the present disclosure is not limited thereto. Any modifications, equivalents, and variants made by those skilled in the art without departing from the scope and spirit of the present disclosure are intended to be within the scope of claims of the present disclosure.

INDUSTRIAL APPLICABILITY

The present disclosure is suitable for the technical field of communication, and is used for reducing or even eliminating an influence of a packet loss event and reducing a time delay of service by performing same-path redundant copying on the data flow of the low-speed deterministic network service.

The invention claimed is:

1. A data transmission protection method, comprising:
encapsulating a packet header for a data flow to be transmitted at an ingress node to form an encapsulated data flow, wherein the packet header comprises a control word and a flow identification;
copying the encapsulated data flow to obtain a copied data flow, and transmitting the encapsulated data flow and the copied data flow together; and
recovering the data flow at a terminating node according to the control word and the flow identification,
wherein before the encapsulating the packet header for the data flow to be transmitted at the ingress node, the method further comprises:
determining whether the data flow is a low-speed data flow sensitive to time delay and packet loss,
in response to that the data flow is the low-speed data flow sensitive to time delay and packet loss, assigning a unique flow identification to the data flow, and encapsulating the packet header for the data flow to be transmitted at the ingress node; and
in response to that the data flow is not the low-speed data flow sensitive to time delay and packet loss, directly transmitting the data flow.

2. The data transmission protection method according to claim 1, wherein the step of copying the encapsulated data flow to obtain the copied data flow, and transmitting the encapsulated data flow and the copied data flow together comprises:
coping the encapsulated data flow to obtain (1+n) encapsulated data flows, wherein flow identifications and control words of the (1+n) encapsulated data flows are completely the same, and n is an integer greater than or equal to 1; and
transmitting the (1+n) encapsulated data flows to a receiving terminal together.

3. The data transmission protection method according to claim 2, wherein the step of recovering the data flow at the terminating node according to the control word and the flow identification comprises:
receiving the data flow, determining whether the data flow reaches the terminating node for a first time according to the control word of the data flow,
in response to that the data flow reaches the terminating node for the first time, recovering the data flow, and removing the packet header encapsulated for the data flow; and
in response to that the control word of the data flow currently received is the same as the control word of the data flow previously received, discarding the data flow currently received.

4. A data transmission protection system, comprising a memory, a processor, and at least one application program stored in the memory and configured to be executed by the processor, wherein the application program is configured to perform the data transmission protection method according to claim 1.

5. A computer-readable storage medium, storing a computer program, which, when executed by a processor, implements the data transmission protection method according to claim 1.

* * * * *